United States Patent [19]

Maher

[11] 4,187,219

[45] Feb. 5, 1980

[54] STARCH COATING PIGMENT FOR PAPER

[75] Inventor: Thomas K. Maher, LaGrange Park, Ill.

[73] Assignee: CPC International Inc., Englewood Cliffs, N.J.

[21] Appl. No.: 861,069

[22] Filed: Dec. 15, 1977

[51] Int. Cl.² ............................................. C08L 3/02
[52] U.S. Cl. ........................... 260/17.4 ST; 106/213; 428/512
[58] Field of Search ................ 106/213, 214; 127/32, 127/71; 260/17.4 ST; 428/512, 511

[56] References Cited

U.S. PATENT DOCUMENTS

| | | | |
|---|---|---|---|
| 3,067,064 | 12/1962 | Carey | 127/67 |
| 3,281,267 | 10/1966 | Rice | 260/17.4 ST |
| 3,607,396 | 9/1971 | Germino | 127/32 |
| 3,617,383 | 11/1971 | Thurston | 127/32 |
| 4,104,213 | 8/1978 | Chiang | 260/17.4 ST |

*Primary Examiner*—Theodore Morris
*Attorney, Agent, or Firm*—David H. LeRoy; Ellen P. Trevors

[57] ABSTRACT

A pigment coating composition for paper and process for the production of the coating composition by cooking a specially-treated starch product and mixing with clay, wherein the specially-treated starch is characterized as a substantially non-birefringent cold-water swelling, granular starch product.

16 Claims, No Drawings

STARCH COATING PIGMENT FOR PAPER

FIELD OF INVENTION

This invention relates to the use of a cooked specially-treated starch product for paper coatings.

BACKGROUND OF INVENTION

Starch has long been used as an adhesive in pigmented coatings for paper (Starch, Chemistry and Technology; Whistler and Paschall, Editors; Vol. II, Ch. 6; pp. 134–145). In using starch as an adhesive in paper coating, there are certain desirable characteristics, such as the viscosity of the coating formulation, the compatibility of starch with other coating ingredients, IGT pick, adhesive strength, and the like.

Paper coating is used to provide better printing, sharper images, and protective covering for paper. Coatings containing clay are widely used. Addition of colored pigments, starch, latex, or other substances supply special properties to coating compositions. However, clay used in paper coatings must be mixed with water to provide proper viscosity, wetting agents, protective colloids, and an adhesive or binder to bind the clay to the paper surface. Casein is an effective colloid or binder for clay and provides workable viscosity. Unfortunately, casein is relatively expensive.

Modified starches have been used to replace casein. To provide comparable binder characteristics and viscosity, it is necessary to use more starch than casein by weight in clay coatings. The major modification to starch has been a reduction in molecular weight by thinning the starch by acids, enzymes, or oxidation.

In recent years, the use of derivatized starches in paper coating has become more desirable due to the unique properties characterizing these starch products. Unfortunately, the use of starch derivatives adds to the cost of the coating formulation. Hydroxyethyl starch is one of the most widely accepted and used starch derivatives for paper coating colors. The use of hydroxyethyl starch in paper coating colors results in improved flow properties, ink receptivity and printing properties (Starch, Chemistry and Technology; Whistler and Paschall, Editors; Vol. 2, Ch. 17; pp. 427–428).

U.S. Pat. No. 3,884,853 relates to an alkali-stable, modified starch for use in paper coating binders as a replacement for protein (casein and delta protein) over a broad pH range. In this patent a cationic starch derivative having quaternary ammonium groups is reacted with maleic anhydride to yield an amphoteric starch having a net anionic charge. Again, unfortunately the cost of derivatization and particularly double derivatization in the case of U.S. Pat. No. 3,884,853 is prohibitive.

Recently Japanese Unexamined Patent Application No. 75,104/76 describes the use of a cross-linked starch product as a replacement for clay in styrene butadiene latex coating compositions for paper.

U.S. Ser. No. 745,145 now U.S. Pat. No. 4,104,213 relates to latex compositions containing a substantially non-birefringent cold-water swelling granular starch product characterized as having less than 10% solubles and having a swelling power such that each 5 g. when dispersed in water and held for 16 hrs. at 25° C. swells from about 20-ml. to about 35-ml. and to processes for manufacture of latex compositions. In U.S. Ser. No. 745,145 the starch specialty product is incorporated directly into the latex composition without any further treatment.

U.S. Ser. No. 780,614 relates to the use of specially-treated, substantially non-birefringent cold-water swelling granular starch product which is added at the wet-end of paper manufacture or sprayed uniformly onto the wet-web or plys of cellulosic pulp. In U.S. Ser. No. 780,614 the specially-treated starch product is not subjected to further modification prior to its application in paper.

U.S. Pat. No. 3,067,064 discloses a process for producing thin-boiling starch materials having swollen unruptured cells characterized by absence of maltese crosses when illuminated by polarized light when viewed under a microscope. The starchy materials are said to be useful for sizing textiles and papers and for glues and adhesives. However, no details are given pertaining to the use of the starch product and paper coating formulations.

Various methods for coating and coating equipment are available in the paper industry. In application of a coating to paper, viscosity of the coating composition may be altered to fit the method of application. In recent times, blade coating is the most widely used method. In this method, paper traveling around a roll passes through the coating color and then a blade smoothes the surface. Roll coating is another method for coating paper which uses a series of rolls to meter or apply the coating to paper. Air knife coating applies an excess coating to the paper which is removed by pressurized air to provide a smooth coating.

SUMMARY OF THE INVENTION

This invention pertains to a process for the production of a pigment coating composition for paper containing an improved cooked starch product which comprises the steps of cooking in water a substantially non-birefringent, cold-water swelling, granular starch product characterized prior to cooking as having less than 10% solubles and a swelling power such that each 5 g. when dispersed in water and held for about 16 hours at 25° C. has a swollen volume of from about 20-ml. to about 35-ml., and mixing the cooked starch product into the clay slip to obtain a pigment coating composition for paper.

The present invention is also directed to a pigment composition for paper containing an improved cooked starch product which comprises cooked substantially non-birefringent, cold-water swelling, granular starch product characterized prior to cooking as having less than 10% solubles and a swelling power such that each 5 g. when dispersed in water and held for about 16 hours at 25° C. has a swollen volume of from about 20-ml. to about 35-ml., and coating clay.

Furthermore, the present invention is concerned with pigment compositions for paper and a process for the production of pigment compositions for paper wherein said compositions comprise cooked substantially non-birefringent, cold-water swelling, granular starch product, characterized prior to cooking as having less than 10% solubles and a swelling power such that each 5 g. when dispersed in water and held for about 16 hours at 25° C. has a swollen volume of from about 20-ml. to about 35-ml., latex, and coating clay.

DESCRIPTION OF PREFERRED EMBODIMENTS

It has now been found that an improved paper coating can be prepared by cooking an underivatized specially-treated substantially non-birefringent cold-water swelling granular starch product. According to this invention, the specially-treated starch product must be further cooked to produce the desired paper coating formulation. Following the process of this invention, a paper coating color superior to a hydroxyethyl starch containing paper coating is possible. Thus, an economical paper coating is made possible by cooking or activating a partially swollen starch product, which avoids the more complex starch derivatization procedures.

In contrast to U.S. Ser. No. 745,145, the starch product of the instant invention must be cooked before incorporation into a starch, latex, and clay composition and is intended to provide a paper coating composition and not for replacement of latex polymer. Therefore, this invention relates to cooking to prepare a specially-treated non-birefringent, cold-water swelling granular starch for use in a paper pigment coating formulation.

Moreover, this invention discloses unexpected properties induced into the starch molecule by; first, preparing a specially-treated starch in a dried partially swollen state; and secondly, cooking the specially-treated starch for incorporation into a coating formulation. It was expected that further cooking in an aqueous solution would produce a fully gelatinized starch and that paper coatings produced therefrom would be inferior to partially swollen starch and at least similar to a pre-gelatinized or fully gelatinized starch product.

After cooking, however, the specially-treated starch product had solubles less than about 40% and appeared as a uniformly dispersed composition. Moreover, as will hereinafter be described, the specially-treated starch product performed as well as or better than hydroxyethyl starch in similar paper coating formulations and requires no acid, enzyme, or oxidation treatment for acceptable viscosity or solids level in latex paper coatings.

According to the present invention, production of the substantially non-birefringent, cold-water swelling granular starch may be made by procedures in which moisture level, temperature and time are varied to produce a starch product which has the proper solubles, swollen volume and has substantially no birefringents. For example, said procedures may involve extrusion, steam injection cooking or microwave heating. It is preferred that a steam injection procedure as hereinafter described be employed.

The term "cold-water swelling" is used herein to describe starch products which absorb water and swell on contact with an aqueous liquid. The substantially non-birefringent cold-water swelling granular starch product of this invention has been rendered cold-water swelling by a heat-moisture treatment under closely controlled conditions wherein granular starch having a moisture content from about 30% to 40% is heated to a temperature of about at least 170° F. (76.6° C.) and thereafter dried to a moisture content less than about 10% moisture. The dried heat-moisture treated starch product may be ground or milled to obtain a desired particle size. For use in a paper coating formulation it is preferred to use the unground specially-treated starch product.

The specially-treated partially swollen starch product is neither granular nor fully gelatinized and is characterized as having less than 10% solubles, preferably less than 5% solubles in water at 25° C. and it is substantially non-birefringent, i.e., less than about 10% of the starch is birefringent as evidenced by the presence of a maltese cross under polarized light when viewed under a microscope. The product when milled to a size of less than 105 microns is characterized as having a swollen volume of at least 20-ml. and as high as 35-ml. under the following conditions:

5 grams of the milled starch was placed in 50-ml. of water and allowed to stand overnight at room temperature. The starch that settles will occupy the desired volume. For comparison in this test, granular corn starch will occupy a volume of 8.5 ml.

To determine solubles 3 grams dry weight basis of the milled starch is placed in 100 cc. of water and stirred for one hour at 25° C. and centerfuged at 2000 rpm for 10 min. The supernatant or unsettled portion should contain less than 10% solubles for the uncooked specially-treated starch product.

The specially-treated starch product of the instant invention is distinguished over prior art starch products which are fully granular, fully gelatinized, or used directly in a partially swollen state without cooking. The fully gelatinized products of the prior art are dried under conditions which produce shards or fragments if dried under roll dried conditions or beadlets containing entrapped air if derived from spray drying. The substantially non-birefringent, cold-water swelling, granular starch products of this invention are neither completely gelatinized nor fragmented and contain partially swollen non-birefringent starch granules and must be cooked before being used in a paper coating composition.

As a comparison test, uncooked heat-moisture treated starch ground to a particle size of less than 75 microns was combined with a styrene-butadiene latex (DOW620) and evaluated in a paper coating color formulation containing 100 parts clay, 8 parts of the uncooked specially-treated starch and 8 parts latex at 50% solids. The uncooked specially-treated starch coating failed immediately when subjected to the IGT pick test, while a hydroxyethyl starch-latex control gave a pick at 175 ft. per min. The hydroxyethyl starch used in the control was (Ethylex 2020 A. E. Staley). DOW 620 latex is a carboxylated styrene-butadiene polymer which is available at a 50% solids level at pH 6.0 and is designed for coating paper and paperboard. The control coating formulation contained 100 parts clay, 8 parts hydroxyethyl starch and 8 parts of styrene-butadiene latex (DOW 620).

To be effective in paper, a specially-treated starch product as herein described which has been dried is dispersed in water at a solids level of from about 7% to about 15%, heated with stirring to approximately 90° C. and held with stirring at above about 90° C. for about 15 minutes. Then the cooked specially-treated starch is combined with the clay slip and the synthetic latex binder to form from about a 50% to about 60% total solids level. The cooked specially-treated starch and the synthetic latex binder combination is at a preferred level of about 16 parts binder per hundred parts of clay. Preferably a tetrasodium pyrophosphate dispersing aid is used with the clay. Preferably enough alkali is added to bring the clay suspension to a pH of about 7 to 7.5 prior to addition of the specially-treated starch product.

To further illustrate the concept of this invention, a coating formulation was prepared containing 100 parts clay, 4 parts of cooked specially-treated starch product having a swollen volume of 26-mil. and 12 parts of styrene-butadiene latex (DOW 620) and compared to a coating composition of 100 parts clay, 4 parts hydroxyethyl starch (Ethylex 2020 A. E. Staley) and 12 parts of styrene-butidiene latex (DOW 620). At 55% solids level, the viscosity of the hydroxethyl starch control was 124 centipoise and had an IGT pick of 242 ft/min. The cooked specially-treated starch product at 55% coating color solids level had a viscosity of 450 centipoise and an IGT pick of 343 ft/min. (a 42% increase in IGT pick). At the 60% coating color solids level, the hydroxyethyl starch containing pigment coating had a viscosity of 130 centipoise and an IGT pick of 255 ft/min. At the 60% coating color solids level the specially-treated starch coating had a viscosity of 800 centipoise and an IGT pick of 379 ft/min. (a 48% increase in IGT pick). The superiority of the cooked specially-treated starch product in comparison to a hydroxyethyl starch or uncooked specially-treated starch is thus demonstrated with the IGT pick test.

The procedure used for the IGT pick to determine the surface strength using an IGT tester was the TAPPI method described as T499su-64 (1964). This method is used to measure the pick resistance of paper by close simulation of the printing process by the use of tack-graded inks on typical packing materials using a mechanical action similar to that of the printing press. The procedures measure the pick resistance of coated and uncoated papers. It consists of printing a 25 cm. strip of paper in an accelerating printmaker. As the printing speed increases, the force exerted on the paper by the ink increases, until picking occurs. This is the end-point which is referred to as the "pick" or "pick resistance" which is defined as the property of surface layer or layers to withstand the force of separation of the paper sheet from the ink plate or blanket acting perpendicular to the surface of the paper, which force tends to rupture or break away surface fragments. In the IGT pick tests to measure pick resistance, we use a No. 5 ink with a No. 2 clay for the coating formulation which is applied with a Mayer Rod to the felt side of the paper at about a 10 lb. coating weight. The ratio of specially-treated starch binder to pigment may vary from about 16 parts per 100 parts clay to about 14 parts per 100 parts clay and still provide satisfactory IGT picks.

While applicants do not want to be bound by any particular theory to explain results of this invention, it is believed that the excellent film forming properties and low viscosity of the specially-treated starch product of this invention produce the superior bonding of the pigment coating composition. The specially-treated starch product as previously described is a partially swollen starch product. When dispersed in room temperature water, the specially-treated starch product appears to be comprised of clusters or agglomerates of partially swollen starch particles. In this state, the specially-treated starch product has low solubles and low viscosity, thus enabling a high solids binder composition for a paper coating formulation. Nevertheless, an effective coating composition is unobtainable unless the specially-treated starch product is cooked or subjected to pasting conditions prior to combining with clay or latex to form the paper coating composition.

It is believed that cooking of the specially-treated starch product causes the agglomerates to disassociate and release some solubles and the soluble content of the cooked specially-treated starch product rises to a value of approximately 40%. The specially-treated starch product after being cooked does not resemble a fully gelatinized or pre-gelatinized starch which is completely soluble. Moreover, if a non-thinned fully gelatinized or pre-gelatinized native starch is used in a paper coating, a high solid starch content would be difficult to obtain in the coating composition due to the high viscosity of the starchy material. The cooked specially-treated starch product, on the other hand, has an acceptable viscosity in latex paper coatings due to its partially swollen nature, wherein dispersed non-agglomerated starch particles are present, particularly after cooking. According to this invention, the cooked specially-treated starch products from all types of starches; for example, those derived from corn, potatoes, rice, wheat, tapioca, etc., may be used in the paper coating compositions of this invention.

The following examples further illustrate the present invention and will enable others skilled in the art to understand it more completely. It should be understood, however, that the invention is not limited solely to the examples given below:

EXAMPLE I

Preparation of Heat-Moisture Treated Product 31.75 kg. dry corn starch at about 12% moisture was added to an 85 l. Patterson/Kelly Batch Blender. Water was added by pump to adjust the starch to 38% moisture during agitation. Steam at 1.05 kg/cm$^2$ was added during agitation until a temperature of 185° F.–190° F. was obtained and then steam was added periodically during a holdtime sufficient to give desired volume in the swollen volume test. The product was then removed and dried. The dried product for characterization may be ground; for example, with a water-cooled Fitzmill to obtain a milled product less than 105 microns in size. Relationship of temperature, time, and swollen volume for heat-moisure treatment is given below:

| Test No. | Temp. °F. | Hold Time (mins.) | Swollen[a] Volume (ml) |
| --- | --- | --- | --- |
| 1 | 185 | 10 | 25.0 |
| 2 | 185 | 10 | 26.0 |
| 3 | 185 | 15 | 23.5 |
| 4 | 185 | 21 | 24.8 |
| 5 | 185 | 22 | 28.3 |
| 6 | 187 | 15 | 27.3 |
| 7 | 187 | 15 | 27.7 |
| 8 | 190 | 10 | 28.2 |
| 9 | 190 | 15 | 27.2 |
| 10 | 190 | 15 | 28.2 |

[a]Settled volume of 5 g. of starch when milled to a particle size of less than 105 microns and held in 50 ml. of water at room temperature for about 16 hours.

EXAMPLE II

A substantially non-birefringent cold-water swelling, granular starch product prepared as in Example I and having a swollen volume of 26-ml. was dispersed in water and cooked for 15 minutes above 90° C. with stirring at 600 rpm to provide cooked starch solids levels of 6%, 12% and 15% solids by weight.

The cooked specially-treated starch was used to prepare coating colors at 50% solids using 16 parts binder per 100 parts clay. The binder was a combination of the specially-treated starch and styrene-butadiene latex (DOW 620). A control hydroxyethyl starch (Ethylex 2020, A. E. Staley) was cooked and used with the styrene-butadiene latex as a binder at 50% solids and 16 parts binder per 100 parts clay in a coating color formulation.

All formulations were coated on a 50-lb. coating stock, calendered, conditioned and tested for IGT pick resistance. Results are shown in the following TABLE I.

TABLE I

Pigmented Coating Colors at 50% Solids
(16 parts Binder to 100 parts Clay)

| Starch Product | Pigment Binder | | Coating Viscosity (cps)[d] | IGT Pick (50 kg - 2.5M/sec. #5 Ink Ft./Min. |
|---|---|---|---|---|
| | Parts Starch | Parts[c] Latex | | |
| Specialty Starch[a] | 4 | 12 | 152 | 265 |
| HE Starch[b] | 4 | 12 | 70 | 134 |
| Specialty Starch[a] | 8 | 8 | 1164 | 233 |
| HE Starch[b] | 8 | 8 | 123 | 153 |
| Speciality Starch[a] | 12 | 4 | 4690 | 278 |
| HE Starch[b] | 12 | 4 | 170 | 202 |

[a]Swollen Volume = 26-ml.
[b]Hydroxyethyl Starch (Ethylex 2020, A. E. Staley)
[c]Styrene-Butadiene Latex (DOW 620)
[d]Brookfield Viscosity Centipoise at 100 rpm These results show that the cooked specially-treated non-birefringent, cold-water swelling, granular starch product provides coatings superior to a commercially used hydroxyethyl starch as determined by the IGT pick.

EXAMPLE III

A substantially non-birefringent cold-water swelling, granular starch product prepared as in Example I and having a swollen volume of 26-ml. was dispersed in water and cooked 15 minutes at 90° C. with stirring at 600 rpm to provide a cooked starch solids level of 9% by weight.

The cooked specially-treated starch was used to prepare coating colors at 55% solids using 16 parts binder per 100 parts clay. The binder was a combination of 4 parts specially-treated starch and 12 parts of styrene-butadiene latex (DOW 620). A control hydroxyethyl starch (Ethylex 2020 A. E. Staley) was cooked and used with the styrene-butadiene latex as a binder at 55% solids and 16 parts binder per 100 parts clay in a coating formulation.

The coating formulations were coated on 50-lb. coating stock, calendered, conditioned, and tested for IGT pick resistance. Results are shown in the following TABLE II.

TABLE II

Pigmented Coating Colors at 55% Solids
(16 parts Binder to 100 parts Clay)

| Starch Product | Pigment Binder | | Coating Viscosity (cps)[d] | IGT pick (50 kg - 2.5M/sec. #5 Ink Ft./Min. |
|---|---|---|---|---|
| | Parts Starch | Parts[c] Latex | | |
| Specialty Starch[a] | 4 | 12 | 450 | 343 |
| HE Starch[b] | 4 | 12 | 124 | 228 |

[a]Swollen Volume = 26-ml.
[b]Hydroxyethyl Starch (Ethylex 2020, A. E. Staley)
[c]Styrene-Butadiene Latex (DOW 620)
[d]Brookfield Viscosity Centipoise at 100 rpm These results show that the cooked specially-treated non-birefringent cold-water swelling granular starch product provides at 55% coating solids a 50% increase in IGT pick when compared to a commercially used hydroxyethyl starch.

EXAMPLE IV

Example III was repeated for a 60% solids coating using a cooked substantially birefringent cold-water swelling, granular starch product prepared as in Example I at a cooked starch solids level of 15% by weight. Results are shown in the following TABLE III.

TABLE III

Pigmented Coating Colors at 60% Solids
(16 parts Binder to 100 parts Clay)

| Starch Product | Pigment Binder | | Coating Viscosity (cps)[d] | IGT Pick (50 kg - 2.5M/sec #5 Ink Ft./Min. |
|---|---|---|---|---|
| | Parts Starch | Parts[c] Latex | | |
| Speciality Starch[a] | 4 | 12 | 800 | 379 |
| HE Starch[b] | 4 | 12 | 130 | 255 |

[a]Swollen Volume = 26-ml.
[b]Hydroxyethyl Starch (Ethylex 2020, A. E. Staley)
[c]Styrene-Butadiene Latex (DOW 620)
[d]Brookfield Viscosity Centipoise at 100 rpm These results show that the cooked specially-treated non-birefringent cold-water swelling granular starch product in a 60% solids coating provides a 49% increase in IGT pick and continues to be superior to a commercially used hydroxyethyl starch.

EXAMPLE V

As a comparison, uncooked specially-treated starch product was ground to a particle size of less than 75 microns using a water-cooled Fitzmill. 8 parts of the milled uncooked specially-treated starch was added to 100 parts clay along with 8 parts of styrene-butadiene latex (DOW 620) to form a coating composition having 50% total solids.

Coating compositions of cooked specially-treated starch product and hydroxyethyl starch were prepared as in Example II at 8 parts starch to 8 parts styrene-butadiene latex to 100 parts clay made up as a 50% total solids.

All formulations were coated on a 50-lb. coating stock, calendered, conditioned and tested for IGT pick resistance. Results are shown in the following TABLE IV.

TABLE IV

Pigmented Coating Colors at 50% Solids
(16 parts Binder to 100 parts Clay)

| Starch Product | Pigment Binder Parts Starch | Parts[c] Latex | Coating Viscosity (cps)[d] | IGT Pick (50 kg - 2.5M/sec) #5 Ink Ft./Min. |
|---|---|---|---|---|
| Cooked Specialty Starch[a] | 8 | 8 | 1164 | 233 |
| Uncooked Specialty Starch[a] | 8 | 8 | 148 | Complete failure |
| HE Starch[b] | 8 | 8 | 121 | 178 |

[a]Swollen Volume = 26-ml.
[b]Hydroxyethyl Starch (Ethylex 2020, A. E. Staley)
[c]Styrene-Butadiene Latex (DOW 620)
[d]Brookfield Viscosity Centipoise at 100 rpm These results show that cooking is necessary to obtain a coating formulation of specially-treated non-birefringent, cold-water swelling granular starch product which is superior to hydroxyethyl starch.

EXAMPLE VI

Four coating colors were prepared at 50% solids with 16 parts binder to 100 parts clay. 8 parts of cooked specially-treated starch was used with 8 parts styrene-butadiene latex (DOW 620) and 8 parts cooked hydroxyethyl starch. Controls of hydroxyethyl starch, latex, and their combinations were included. Formulations were coated on a 50-lb. coating stock, calendered, conditioned and tested for IGT pick resistance. Results are shown in the following Table V.

TABLE V

Pigmented Coating Colors at 50% Solids
(16 parts Binder to 100 parts Clay)

| Pigment Binder (Parts) | | | Coating Viscosity (cps)[d] | IGT Pick (50 kg - 2.5M/sec) #5 Ink Ft./Min. |
|---|---|---|---|---|
| Specialty[a] Starch | HE[b] Starch | Latex[c] | | |
| 8 | — | 8 | 1164 | 233 |
| — | 16 | — | 393 | 206 |
| — | 8 | 8 | 121 | 178 |
| 8 | 8 | — | 1164 | 141 |

[a]Swollen Volume = 26-ml.
[b]Hydroxyethyl Starch (Ethylex 2020, A. E. Staley)
[c]Styrene-Butadiene Latex (DOW 620)
[d]Brookfield Viscosity Centipoise at 100 rpm These results show that the cooked specially-treated non-birefringent, cold-water swelling, granular starch product provides coatings superior to a commercially used hydroxyethyl starch and combination of the specially-treated starch with hydroxyethyl starch as determined by IGT pick.

Although the foregoing examples demonstrate the preferred latex coating formulations containing cooked specially-treated, non-birefringent, cold-water swelling, granular starch, it is to be understood that other types of latex coating formulations can be employed, so long as the cooked specially-treated starch is used.

We claim:

1. A process for the production of a pigment coating composition for paper containing an improved cooked starch product which comprises the steps of:
   (a) cooking in water a substantially non-birefringent, cold-water swelling, granular starch product characterized prior to cooking as having less than 10% solubles and a swelling power such that each 5 g. when dispersed in water and held for about 16 hours at 25° C. has a swollen volume of from about 20-ml. to about 35-ml.; and
   (b) mixing the cooked starch product characterized as having from greater than 10% solubles to about 40% solubles by weight in water at 25° C. into the clay slip to obtain a pigment coating composition for paper.

2. The process of claim 1 wherein the cooked starch product is characterized as having a solubles content from about 20% to about 40% by weight.

3. The process of claim 1 wherein the starch product is cooked in water at a solids level of from about 7% to about 15% by weight.

4. The process of claim 1 which further comprises adding a preformed latex.

5. The process of claim 4 wherein said latex is a styrene-butadiene latex.

6. The process of claim 4 wherein the combination of latex and cooked starch product is present in the coating at a level of from about 14 parts to about 16 parts for every 100 parts clay.

7. The process according to claim 4 wherein the coating composition has a solids level from about 50% to about 60% by weight.

8. A pigment coating composition from paper containing an improved cooked starch product which comprises:
   (a) cooked substantially non-birefringent, cold-water swelling, granular starch product, characterized prior to cooking as having less than 10% solubles and a swelling power such that each 5 g. when dispersed in water and held for about 16 hours at 25° C. has a swollen volume of from about 20-ml. to about 35-ml. and characterized after cooking as having solubles from greater than 10% to about 40% by weight in water at 25° C.; and
   (b) coating clay.

9. The composition of claim 8 wherein the cooked starch product is characterized as having a solubles from about 20% to about 40% by weight in water at 25° C.

10. The composition of claim 8 which further comprises latex.

11. The composition of claim 9 wherein the latex is a styrene-butadiene latex.

12. The composition of claim 9 wherein the combination of latex and cooked starch product are present in the coating at a level of from about 14 parts to about 16 parts for every 100 parts clay.

13. The composition of claim 9 wherein the solids level is from about 50% to about 60% by weight.

14. The composition of claim 9 wherein the viscosity is from about 100 centipoise to about 5000 centipoise.

15. A conditioned paper coated with the composition of claim 10 characterized as having a pick resistance of at least about 200 feet per minute.

16. A process for the manufacture of a latex paper coating composition containing an improved starch product which comprises activating a substantially non-birefringent cold-water swelling granular starch product, characterized as having less than 10% solubles and a swelling power such that each 5 g. when dispersed in water and held for about 16 hours at 25° C. has a swollen volume from about 20-ml. to about 35-ml., by cooking in water for at least about 15 minutes at a temperature of at least about 90° C.; adding the activated starch product characterized as having solubles from greater than 10% to about 40% by weight in water at 25° C. to a clay slip; and mixing latex with the clay-starch product combination to form said latex paper coating composition, wherein the paper coating composition provides pick resistance of at least about 200 feet per minute to conditioned paper coated with said composition.

* * * * *